United States Patent [19]

Spars et al.

[11] 4,456,504

[45] * Jun. 26, 1984

[54] REACTOR VESSEL AND PROCESS FOR THERMALLY TREATING A GRANULAR SOLID

[75] Inventors: Byron G. Spars, Mill Valley; Paul W. Tamm, Oakland; P. Henrik Wallman, Berkeley, all of Calif.

[73] Assignee: Chevron Research Company, San Francisco, Calif.

[*] Notice: The portion of the term of this patent subsequent to Jun. 29, 1999 has been disclaimed.

[21] Appl. No.: 336,227

[22] Filed: Dec. 31, 1981

Related U.S. Application Data

[63] Continuation-in-part of Ser. No. 145,290, Apr. 30, 1980, Pat. No. 4,337,120.

[51] Int. Cl.³ .................................................. C10B 47/24
[52] U.S. Cl. ..................................... 201/12; 196/125; 201/31
[58] Field of Search .............. 202/108, 105, 150, 222, 202/217, 120, 124, 224, 225; 201/40, 31, 32, 34, 14, 12; 261/111, 113; 196/125, 111; 208/11 R; 423/DIG. 16; 422/142, 139

[56] References Cited

U.S. PATENT DOCUMENTS

| | | | |
|---|---|---|---|
| 2,774,726 | 12/1956 | Eichna | 201/14 |
| 2,783,187 | 2/1957 | Odell | 422/139 |
| 2,893,851 | 7/1959 | Georgian | 422/139 |
| 2,944,009 | 7/1960 | Huntley et al. | 422/139 |
| 3,258,409 | 6/1966 | Schenck et al. | 207/40 |
| 3,705,086 | 12/1972 | Schmalfeld | 201/34 |
| 3,982,900 | 9/1976 | Halgarini et al. | 423/DIG. 16 |
| 4,135,885 | 1/1979 | Wormser et al. | 422/142 |
| 4,157,245 | 6/1979 | Mitchell et al. | 208/11 |
| 4,199,432 | 4/1980 | Tamm et al. | 201/31 |

FOREIGN PATENT DOCUMENTS 2910792  10/1979  Fed. Rep. of Germany ........ 201/12

Primary Examiner—Hiram H. Bernstein
Attorney, Agent, or Firm—S. R. LaPaglia; W. K. Turner; J. W. Ambrosius

[57] ABSTRACT

A reactor vessel for maintaining a staged moving bed of solids, in the presence of countercurrently flowing gas stream, having a diameter of at least one meter and a pressure drop across the body of solids approximately equal to that of a fully fluidized bed and a method for using same to thermally process a granular solid composed of a broad distribution of particle sizes.

7 Claims, 3 Drawing Figures

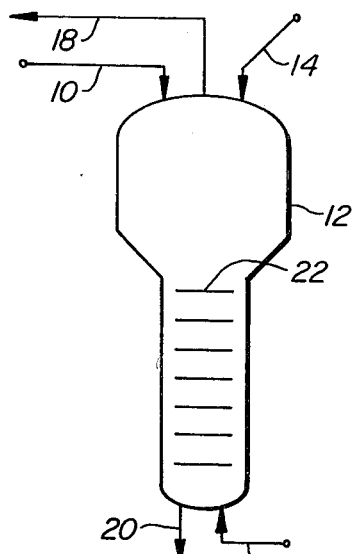
FIG._1.
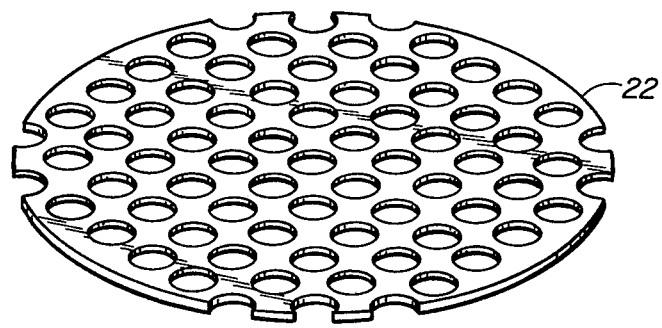
FIG._2.
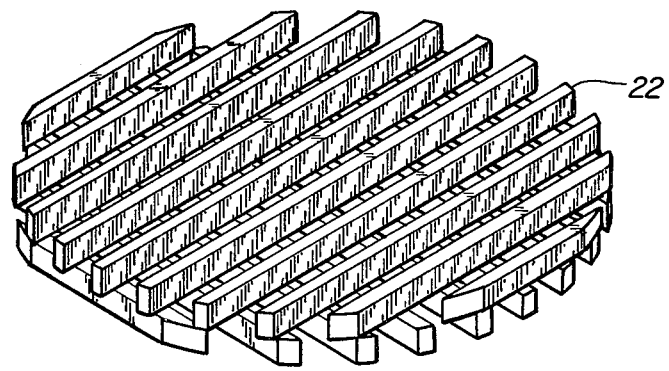
FIG._3.

REACTOR VESSEL AND PROCESS FOR THERMALLY TREATING A GRANULAR SOLID

CROSS-REFERENCE TO RELATED APPLICATION

This case is a continuation-in-part of U.S. application Ser. No. 145,290, filed Apr. 30, 1980, now U.S. Pat. No. 4,337,120.

FIELD OF THE INVENTION

The present invention relates to a reactor for processing a granular solid containing a diversity of particle sizes.

BACKGROUND OF THE INVENTION

Various methods have been proposed for the continuous processing of granular solids. For example, the use of fluidized beds and moving packed beds are well known in the art. Fluidized beds are known to be very efficient in processes where the rapid mixing of solids is desirable. Fully fluidized beds (except when very shallow) are only able to handle particles of relatively uniform size, and as such are unsuitable for handling divided solids containing a broad range of particle sizes. The amount of material that can be handled per unit area of reactor cross-section in a fully fluidized system will be limited by the maximum operable bed depth.

A moving packed bed may be capable of handling a larger volume of material per unit area of reactor cross-section than a fluidized bed. However, a packed bed is not designed to mix solids should this be desired. In addition, in processes requiring the introduction of a gas into the bed, as for example a stripping gas or a reactant gas, non-uniform flow or bridging of the solids can result if the particle size is not uniform.

U.S. Pat. No. 4,199,432 discloses a process for retorting non-uniform particles of oil shale and other hydrocarbon containing solids using "a staged turbulent bed", a reactor design which achieves rapid local mixing of solids, a high solids throughput, and avoids the slugging problems associated with non-uniform particles. The text of this patent is herein incorporated by reference. In the staged turbulent bed, as described in the subject patent, raw shale particles and hot burned shale particles are introduced into an upper portion of a vertically elongated reactor vessel and pass downwardly therethrough. Heat transfer from the hot burned shale to the raw shale provides the heat for retorting.

The maximum particle size for the raw shale and previously retorted shale particles in such a process is normally maintained at or below 2½ mesh, Tyler Standard Sieve size. Particle sizes in this range are easily produced by conventional means such as combination of cage mills, jaw crushers, or gyratory crushers. Raw shale crushing operations may be conducted to meet a maximum particle size specification, but little or no control can be effected over the quantity of smaller particle sizes.

The temperature of the burned shale heat carrier introduced to the reactor is normally in the range of 1100° F.–1500° F. A correspondingly appropriate operating ratio of heat carrier to raw shale is then used to achieve the desired temperature in the reactor. The raw shale is introduced at ambient temperature or, if desired, preheated to reduce the heat requirement from the recycled heat carrier. The temperature at the top of the reactor is normally maintained within the broad range, 850° F. to 1000° F., and is preferably maintained in the range of 900° F. to 950° F.

The weight ratio of burned shale heat carrier to fresh shale may be varied from approximately 1.5:1 to 8:1 with a preferred weight ratio in the range of 2:1 to 3:1. It has been observed that some loss in product yield occurs at the higher weight ratios of burned shale to fresh shale and it is believed that the cause for such loss is due to increased adsorption of the hydrocarbonaceous product vapors by the larger quantities of burned shale. Furthermore, attrition of the shale, which is a natural consequence of retorting and combustion of the shale, occurs to such an extent that there is a maximum recycle ratio which can be achieved using burned shale alone. If it is desired to operate at higher weight ratios of heat carrier to fresh shale, alternative attrition resistant carriers, such as sand, must be provided as part or all of the heat carrier.

The mass flow rate of fresh shale through the reactor is normally maintained between 5,000 kg/hr-m$^2$ and 30,000 kg/hr-m$^2$, and preferably between 10,000 kg/hr-m$^2$ and 20,000 kg/hr-m$^2$. Thus, in accordance with the broader recycle heat carrier weight ratios stated above, the total solids mass rate will range from approximately 12,500 kg/hr-m$^2$ to 270,000 kg/hr-m$^2$, preferably in the range 25,000–176,000 kg/hr-m$^2$, and more preferably 30,000–78,000 kg/hr-m$^2$.

A stripping gas is introduced into a lower portion of the reactor and passes upwardly through the vessel in countercurrent flow to the downwardly moving solids. The flow rate of the stripping gas is normally maintained so as to produce a superficial gas velocity at the bottom of the vessel in the range of approximately 30 cm/second to 150 cm/second, with a preferred superficial velocity in the range of 30 cm/second to 90 cm/second. The stripping gas may be comprised of steam, recycle product gas, hydrogen, an inert gas or any combination thereof. It is particularly important, however, that the stripping gas selected be essentially free of molecular oxygen to prevent combustion of products within the retort.

The stripping gas will fluidize those particles of the raw shale and heat carrier having a minimum fluidization velocity less than the superficial velocity of the stripping gas. Those particles having a fluidization velocity greater than the superficial gas velocity will pass downwardly through the retort, generally at a faster rate than the fluidized particles.

An essential feature of the staged turbulent bed retorting system lies in limiting the maximum bubble size and the gross vertical backmixing of the downwardly moving shale and heat carrier so as to produce stable, substantially plug flow conditions throughout the reactor volume. True plug flow, wherein there is little or no vertical backmixing of solids, allows higher conversion levels of kerogen to vaporized hydrocarbonaceous material than can be obtained, for example, in a fluidized bed retort of equivalent volume (where there is gross top to bottom mixing). Maintaining substantially plug flow conditions by limiting top to bottom mixing of solids, allows much greater control of the residence time of individual particles. Such control permits a substantial reduction in size of the retort zone required for a given oil production rate, since the chances for removing partially retorted solids with the retorted solids are reduced.

Gas bubbles in a fluidized bed coalesce to form larger bubbles as they rise. Oversized bubbles cause surging or pounding in the bed, leading to a significant loss of efficiency in contacting and an upward spouting of large amounts of material at the top of the bed. The means provided for limiting backmixing also reduces the coalescence of bubbles, thereby allowing the size of the disengaging zone to be somewhat reduced. The means for limiting backmixing and limiting the maximum bubble size can generally be described as baffles, barriers, dispersers or flow redistributors, and may, for example, include spaced horizontal perforated plates, bars, screens, packing, or other suitable internals.

Although gross vertical backmixing should be avoided, highly localized mixing is desirable in that it enhances the degree of contacting between the solids and between the solids and gas. Localized mixing necessarily introduces some backmixing and thus deviates from strictly plug-flow behavior. The degree of backmixing is dependent on many factors, but is primarily dependent upon the particular internals or baffles disposed within the retort.

Of great importance in the staged turbulent bed reactor is the interaction between the fluidized solids, the non-fluidized solids, and the internals employed for preventing backmixing. The fluidized solids generally proceed down the reactor as a moving fluidized columnar body. Without internals, a stable moving fluidized bed cannot be achieved with a solids mixture having a broad particle size distribution. The internals significantly affect the motion of the non-fluidized particles and thereby substantially increase the residence times of said particles. The average velocity of the falling non-fluidized particles, which determines said particles' residence time, is substantially decreased by momentum transfer to the fluidized particles and the retort vessel internals. The increased residence time permits the larger particles to be retorted in a single pass through the vessel. It has been discovered that with some internals, such as horizontally disposed perforated plates having a 49% free area and spaced throughout the vessel at one foot spacings, the residence time of the non-fluidized particles approaches the average particle residence time.

A reactor combining overall plug flow characteristics with intense local mixing provides the equivalent of a serial plurality of perfectly mixed stages. The term "perfectly mixed stage" as used herein refers to a vertical section of the retort wherein the degree of solids mixing is equivalent to that attained in a perfectly mixed volume having gross top-to-bottom mixing. The number of equivalent perfectly mixed stages actually attained depends upon many inter-related factors, such as bed height, gas velocity, particle size distribution and the type of internals selected to limit gross top-to-bottom mixing.

Excellent stripping of the volatizable hydrocarbonaceous product from the retorted solids is uniquely achieved with the staged turbulent bed reactor. With staged flow characteristics, the "lean" stipping gas first contacts those particles having the least amount of adsorbed hydrocarbonaceous material, thus maximizing the driving force for mass transfer of the hydrocarbonaceous product into the fluidization gas stream.

As the hydrocarbon vapors evolved from the shale mix with the stripping gas, the gas velocity increases along the length of the reactor. The actual amount of increase will depend upon the grade of shale processed and the mass rate of fresh shale per unit cross-sectional area, but it may be minimized, if necessary, by proper initial design of the retort vessel itself. In this regard, the vessel may have an inverted frustoconical shape or may be constructed in sections of gradually increasing diameter.

The pressure at the top of the reactor is preferably maintained no higher than that which is required to accomodate downstream processing. The pressure in the bottom of the reactor will naturally vary with the height of the reactor and the chosen downstream equipment, but will normally be in the range of 2–4 atmospheres.

A product effluent stream comprised of hydrocarbonaceous material admixed with the stripping gas is removed from the upper portion of the retort by conventional means and passes to a separation zone. Since the product effluent stream will normally contain some entrained fines, it is preferred that said fines be separated from the remainder of the stream prior to further processing. This separation may be effected by any suitable means; conventional examples are cyclones, pebble beds and/or electrostatic precipitators.

The retorted shale along with the burned shale serving as heat carrier is removed from the lower portion of the retort by conventional means at the retort temperature. The retorted shale will normally have a carbonaceous residue content of approximately 2 to 4 weight percent and represents a valuable source of energy which may be used to advantage in the process.

The retorted shale and burned shale heat carrier are fed to a combustor which may be of any conventional design, but it is preferred that it be a dilute phase lift combustor. Air is injected into the lower portion of this combustor and the carbonaceous residue on the shale is partially burned as the shale is transported. This combustion heats the shale mixture to a temperature in the range of 1100° F. to 1500° F. and the hot shale and flue gas are removed from the upper portion of the combustor. A portion of said hot shale is recycled to the retort to provide heat for retorting. Preferably said recycled shale is classified to remove substantially all of the minus 200 mesh particles prior to introduction to the retort so as to minimize entrained fines carryover with the retort product vapors.

The present invention is directed to an improved staged turbulent bed reactor whose bed pressure drop closely approximates that observed in a fully fluidized bed. This has the advantage of reducing the energy required to pump the countercurrent flow of gas through the reactor.

SUMMARY OF THE INVENTION

The present invention relates to a reactor vessel for the processing of a body of granular solids containing a diversity of particle sizes in the presence of a countercurrently flowing gas, which comprises:

(a) a closed, vertically elongated, generally cylindrical vessel having a diameter of at least one meter;

(b) means for passing a gas upwardly through the vessel at a preselected velocity sufficient to fluidize a first fraction of the granular solids but insufficient to fluidize a second fraction of said solids;

(c) means for introducing the granular solids into the upper portion of the vessel and withdrawing them from the bottom of the vessel, whereby the granular solids pass downward through the vessel as a continuous moving body of granules countercurrent to the gas passing upwards therethrough; and (d) a plurality of dispersing elements internally disposed within the vessel for substantially limiting gross vertical backmixing of the granular solids and for increasing the residence time of the second fraction of non-fluidized granules, said dispersing elements being so disposed and constructed as to keep the pressure drop across the body of solids between about 80% and 130% of the total weight of the solids divided by the cross-sectional area of the vessel while allowing no more than about a 5% fluctuation in said pressure drop.

The present invention is also directed to an improved method for carrying out the thermal processing of a granular solid containing a diversity of particle sizes in a staged turbulent bed reactor which includes the steps of passing said granular solids downward as a continuous moving body of solids through a reactor vessel having internally disposed therein a plurality of dispersing elements arranged and constructed so as to substantially limit gross vertical backmixing and slugging of solids; and passing a gas upward through the reactor vessel in a generally countercurrent flow to the downward movement of the body of solids at a velocity sufficient to fluidize a first fraction of granules but insufficient to fluidize a second fraction, the improvement comprising using a reactor vessel having a diameter of a least one meter and containing dispersing elements designed to maintain the pressure drop across the body of solids within the range of from about 80% to about 130% of the total weight of the solids divided by the cross-sectional area of the vessel and to allow no more than about a 5% fluctuation in said pressure drop.

Although the reactor vessel and the method for thermally treating solids herein described are most advantageously used for pyrolyzing a hydrocarbonaceous solid such as oil shale, the reactor and method are not limited to use with such materials. The reactor and method are also useful for the treatment of other granular materials containing a diversity of particle sizes. Thus the invention may be used for the reduction of iron ores, calcining of phosphate minerals or carbonate minerals (such as limestone and dolomite), etc. In addition, the method for thermally treating a solid is not limited to heating the granules, it may also include drying or cooling the granules passing through the vessel.

DESCRIPTION OF THE DRAWINGS

FIG. 1 is a schematic of a staged turbulent bed reactor vessel.

FIG. 2 is a perspective view of a perforated plate baffle suitable for use in the staged turbulent bed reactor vessel.

FIG. 3 is a perspective view of a grille plate suitable for use in the staged turbulent bed reactor vessel.

DETAILED DESCRIPTION OF THE INVENTION

As noted above the most desirable embodiment of the staged turbulent bed is one in which the pressure drop across the body of solids is approximately equivalent to that observed in a fully fluidized bed. It has been found that such a condition in a staged turbulent bed is dependent upon the diameter of the reactor vessel and the design and arrangement of the dispersing elements. In a true fluidized bed the pressure drop across the bed will be approximately equal to the weight of the solids divided by the cross-sectional area of the vessel, often referred to as the "static head". Therefore, the pressure drop across the fluidizing bed will be about 100% of the "static head" of the bed. The most desirable form of the staged turbulent bed will also display a pressure drop across the body of solids of approximately 100% of the static head. Most broadly the invention is directed to a staged turbulent bed achieving a pressure drop across the body of solids of between 80% and 130% of the static head of the body of solids. As the diameter of the reactor vessel increases the structure of the dispersing elements becomes more important in achieving the desired pressure drop.

An essential feature of the staged turbulent bed lies in limiting the maximum bubble size and the gross vertical backmixing of the downwardly moving solids to produce stable, staged solids flow conditions throughout the vessel volume.

Limiting gross vertical backmixing of solids and gas slugging is attained through the use of suitable internals or baffles. The internals function to break up large gas bubbles, prevent gas channeling, accomplish staging of the solids flow, and insure that the coarse non-fluidizable particles will have a sufficient residence time in the reactor vessel.

One measure of the smoothness of the operation of the staged turbulent bed is the fluctuation of the pressure drop across the bed of solids. This fluctuation is caused by gas bubbles erupting at the bed surface and the magnitude of the fluctuation is related to bubble size. A second measure of bed behavior is obtained from the residence time, $\tau$, of the solid granules. Since $\tau$ is a statistical parameter, it is best described in terms of the mean residence time, $\bar{\tau}$, and the standard deviation, $\sigma$. The mean residence time is important because of the kinetic requirements of the thermal processing being carried out in the vessel. The standard deviation is a measure of the solids flow pattern. If the standard deviation is zero, the bed is operating in ideal plug flow whereas a large value of $\sigma$ indicates a high degree of vertical backmixing. For a series of N perfectly mixed stages, it can be shown that:

$$N = \bar{\tau}^2 / \sigma^2$$

Thus, a method of estimating staging in a partially backmixed flow system is to model it as a series of perfectly mixed stages and calculate the number of these theoretical stages from the experimentally determined statistical parameters. It should be noted that N is not necessarily the same for each different particle size. Fine material may experience a somewhat higher degree of backmixing. The number of theoretical stages need not be identical to the number of reactor internals. Since N has been found to be proportional to the bed height, a more useful quantity for comparative purposes is the height equivalent of a mixed stage (HEMS) defined as the total bed height divided by the number of theoretical stages.

The mean residence time is generally also a function of the particle size. For specified particle size ranges $\bar{\tau}$ may be determined from the bed holdup of the specified fraction, the feed rate of the fraction, the total feed rate, and the total bed holdup. The mean residence time of a particular shale size cut d, normalized by the average residence time of all particles ($\bar{\tau}$ bed), may be calculated from:

$$\frac{\bar{\tau}_d}{\bar{\tau}_{bed}} = \frac{(\text{Bed Holdup of size } d)/(\text{Feed rate of size } d)}{(\text{Total Bed Holdup})/\text{Total Feed Rate}} =$$

$$\frac{\text{Bed fraction of size } d}{\text{Feed fraction of size } d}$$

The mean residence time may of a particular size particle also be experimentally determined by repeatedly observing the time required for a radioactively tagged particle to pass through the retort. Experiments have shown good correlation between the results of radioactive tracer studies and calculations based on the mean residence times obtained from observed bed holdups. Using the invention disclosed herein non-fluidizable particles passing through the reaction vessel will achieve a mean residence time of at least 70%, but more preferably at least 90%, of the average residence time of all particles passing through the vessel.

A number of different internals were used in vessels of varying diameter in an attempt to select the best type and configuration of internals. In selecting a system within the scope of the present invention the following characteristics were considered necessary:
 (a) limits slugging;
 (b) prevents gas channeling;
 (c) achieves uniform residence times for particles of different size;
 (d) provides sufficient staging for the solids;
 (e) allows high mass throughout; and
 (f) has sufficient mechanical strength.

The internals must be effective in limiting the slugging due to the formation of large gas bubbles. Slugging of the bed is unfavorable from several respects, but the prime disadvantages lie in damaging vibrations in the reactor itself and disturbances in the operation of downstream equipment. The number of baffles in the reactor vessel will depend on the height of the bed, but in order to achieve the objectives of the invention a minimum of two baffles must be present. Acceptable internals should not permit bed pressure drop fluctuations in excess of 5% of the total mean bed pressure drop and the fluctuations are more preferably maintained in the range of 1 to 3%. The non-slugging condition is obtained by either relatively high open-area baffles with close spacings, such as a 70% open area and a 2½ centimeter spacing, or lower open-area baffles with broader spacings, such as a 50% open area and a 30 centimeter spacing.

Gas channeling manifests itself as an abnormally low pressure drop across the bed of solids as compared with the "static head" (i.e., the weight of the solids divided by the cross-sectional area of the bed of solids). Gross gas channeling can sometimes be observed visually as a non-uniformity of both gas and solids flow across the vessel cross section. Acceptable internals should produce a pressure drop of 80–130% of the "static head". The lower limit applies primarily to high open-area baffle structures while the upper limit applies to low open-area structures (the baffle itself produces some pressure drop).

In general, it has been found that the coarser particles tend to have a shorter residence time than the mean residence time of all particles. This means that the body of solids in the reactor reaches an equilibrium size distribution finer than that of the feed. Low open-area baffle structures have been found to limit this tendency and produce a body of solids in the reactor with a similar size distribution to that of the feed. Open baffle structures, on the other hand, produce beds highly enriched in fines.

The staging, expressed for examples in terms of the height equivalent of a mixed stage (HEMS), is dependent upon baffle open area, baffle hole size, baffle spacing, gas velocity and, in some cases the particle size distribution. As the baffle open area is decreased the HEMS approaches the baffle spacing, that is each baffle produces one perfectly mixed stage. This condition implies that there is no upward backmixing from one stage to the one above, and consequently, the body of solids has become a series of physically distinct entities. The formation of a dilute phase region beneath each individual baffle is not necessarily a desirable condition because the dilute phase volume serves only to decrease the overall density of the body of solids, thus requiring a greater reactor volume for a given operation. Increased hole diameter decreases dilute phase volume but also decreases the staging (increases HEMS). This may be offset by decreasing baffle spacing. Another variable which influences the staging is the gas velocity: the HEMS is approximately proportional to the square root of the fluidizing velocity in the velocity range of 30–90 centimeters per second The maximum achievable mass throughput for the reactor is a function of the baffle open area and hole size and the fluidizing gas velocity. With a 50% open area and a hole size of 1.25 centimeters the maximum throughput was found to be in the range 30,000–60,000 kg/hr-m$^2$ for gas velocities ranging from 30–60 cm/sec. For a hole size of 1.9 centimeters the maximum throughput was in excess of 120,000 kg/hr-m$^2$. Therefore, larger holes increase the maximum throughput. This is also true for higher open areas.

From a structural point of view, low open-area baffle are preferred to high open-area baffles because of their greater inherent mechanical strength for a given hole size. High open-area structures could be built in the form of specialized packing to provide the needed structural integrity. Standard packing material such as Pall rings were tested and found to be inferior to the baffle types of this invention. They allowed gas channeling and produced regions of stagnant solids.

Experiments were conducted to determine the optimum baffle configuration. From these experiments it was determined that the open area should range from approximately 30 to 70% of the total cross-sectional area.

In general, when the diameter of the retorting vessel increases the percent open area of the baffle cross-section should be decreased, and the dimension of the baffle openings should be increased to achieve the desired pressure drop. For most purposes, a 50% open area provides a good tradeoff between effective staging, minimized gas channeling, high coarse particle residence time, high mass throughput and adequate structural strength. Such 50% open-area baffles spaced at 30–90 centimeters and having openings with a maximum dimension of 3.8 to 10 centimeters produce a stable, non-slugging bed, with sufficient staging and a coarse particle residence time of 70–80% of the mean residence time for the entire bed. As used herein, the term "maximum dimension" refers to the diameter of a circular hole or to the diagonal of a rectangular hole.

The baffles, such as vertically-spaced, horizontally disposed perforated plates having round holes or similarly positioned grille plates formed from perpendicularly crossed bars, are preferably constructed of stainless steel, or other materials able to withstand the abrasion of the circulating solids.

In addition to the design of the internal dispersing elements, it has been found that having a vessel diameter of at least one meter is important in achieving the objectives of high throughput and a pressure drop equivalent to that of a fluidized bed.

EXAMPLE

Referring to FIG. 1, granular solids, such as crushed oil shale, and heat carrier particles are introduced through lines 10 and 14, respectively, into an upper portion of a vertically elongated reactor vessel 12 and pass downwardly therethrough. A gas is introduced, via line 16, to a lower portion of vessel 12 and is passed upwardly through the vessel, fluidizing a first portion of the particles. The gas and entrained fines are withdrawn overhead from an upper portion of vessel 12 through line 18. Processed particles are removed from a lower portion of vessel 12 through line 20. A plurality of baffles, such as perforated plates or grille structures 22 are horizontally disposed and vertically spaced throughout the portion of the vessel occupied by the bed so as to prevent slugging, limit gross vertical backmixing, and thereby promote stability within the body of solids. Examples of perforated plate baffles and grille structure baffles, suitable for use in the vessel, are shown in FIGS. 2 and 3 of the drawings.

The maximum particle size for the granular solid and the heat carrier particles is maintained at or below 2½ mesh, and preferably at or below 5 mesh, Tyler Standard Sieve size. The baffle system comprises a plurality of at least 2 vertically-spaced, horizontally-disposed perforated plates or grille bars. The bars or plates are constructed of abrasion-resistant materials, such as stainless steel, and have an open area in the range of 30-70% of the plate cross-sectional area. The open areas comprise holes having a diameter in the range of 3.5 to 15 centimeters.

Preferably the open area constitutes approximately 50% of the plate or grille cross-sectional area and the holes have a diameter of approximately 4 centimeters.

The baffle may be serially rotated so that each plate or grille is not in alignment with the preceding or succeeding plate or grille.

I claim:

1. A reactor vessel for the processing of a body of granular solids containing a diversity of particle sizes in the presence of a countercurrently flowing gas which comprises:
    (a) a closed, vertically elongated, generally cylindrical vessel having a diameter of at least one meter;
    (b) means for passing a gas upwardly through the vessel at a preselected velocity sufficient to fluidize a first fraction of the granular solids, but insufficient to fluidize a second fraction of said solids;
    (c) means for introducing the granular solids into the upper portion of the vessel and withdrawing them from the bottom of the vessel, whereby the granular solids pass downward through the vessel as a continuous moving body of granules countercurrent to the gas passing upwards therethrough; and
    (d) a plurality of dispersing elements internally disposed within the vessel for substantially limiting gross vertical backmixing of the granular solids and for increasing the residence time of the second fraction of non-fluidized granules, said dispersing elements being so disposed and constructed as to keep the pressure drop across the body of solids between about 80% and 130% of the total weight of the solids divided by the cross-sectional areal of the vessel while allowing no more than about a 5% fluctuation in said pressure drop.

2. The reactor vessel of claim 1, wherein the dispersing elements comprise at least 2 vertically-spaced, horizontally-disposed, perforated baffles, each of said baffles having an open area in the range of 30-70% of the baffle cross-sectional area, said open area being composed of holes having a maximum dimension in the range of 3.8 to 10 centimeters.

3. An improved method for carrying out the thermal processing of a granular solid containing a diversity of particle sizes in a staged turbulent bed which includes the steps of passing said granular solids downward as a continuous moving body of solids through a reactor vessel having internally disposed therein a plurality of dispersing elements arranged and constructed so as to substantially limit gross vertical backmixing and slugging of solids; and passing a gas upward through the reactor vessel in a generally countercurrent flow to the downward movement of the body of solids at a velocity sufficient to fluidize a first fraction of granules but insufficient to fluidize a second fraction, the improvement comprising using a reactor vessel having a diameter of at least one meter and containing dispersing elements designed to maintain the pressure drop across the body of solids within the range of from about 80% to about 130% of the total weight of the solids divided by the cross-sectional area of the vessel and to allow no more than about a 5% fluctuation in said pressure drop.

4. The process of claim 3 wherein the granular solids are heated in the reactor vessel.

5. The process of claim 3 wherein the granular solid is mixed with a particulate heat carrier in the reactor vessel and the heat carrier and granular solids achieve thermal equilibrium during passage through the reactor vessel.

6. The process of claim 3 wherein the residence time of the non-fluidizable fraction is at least 70% of the average residence time of all particles passing through the reactor vessel.

7. The process of claim 3 wherein the granular solids are cooled in the reactor vessel.

* * * * *